United States Patent [19]

Solinsky

[11] Patent Number: 5,060,304
[45] Date of Patent: Oct. 22, 1991

[54] ALIGNMENT ACQUIRING, OPTICAL BEAM COMMUNICATION LINK

[75] Inventor: James C. Solinsky, La Jolla, Calif.
[73] Assignee: Cubic Corporation, San Diego, Calif.
[21] Appl. No.: 456,520
[22] Filed: Dec. 26, 1989
[51] Int. Cl.⁵ ............................................. H04B 10/00
[52] U.S. Cl. ..................................... 359/152; 356/152; 356/153; 359/159; 359/399
[58] Field of Search ............... 455/607, 606, 609, 605; 350/537, 543; 356/152, 153, 400

[56] References Cited

U.S. PATENT DOCUMENTS

| | | | |
|---|---|---|---|
| 3,341,707 | 9/1967 | Wingfield et al. | 455/607 |
| 3,433,960 | 3/1969 | Minott | 455/605 |
| 3,504,182 | 3/1970 | Pizzurro et al. | 455/606 |
| 3,504,979 | 4/1970 | Stephany | 356/400 |
| 3,511,998 | 5/1970 | Smokler | 455/606 |
| 3,566,126 | 2/1971 | Lang | 455/607 |
| 3,989,942 | 11/1976 | Waddoups | 455/605 |
| 4,279,036 | 7/1981 | Pfund | 356/152 |
| 4,330,204 | 5/1982 | Dye | 455/607 |
| 4,603,975 | 8/1986 | Cinzori | 356/152 |
| 4,867,560 | 9/1989 | Kunitsuge | 455/607 |

Primary Examiner—Reinhard J. Eisenzopf
Assistant Examiner—Kinfe-Michael Negash
Attorney, Agent, or Firm—Brown, Martin, Haller & McClain

[57] ABSTRACT

A pair of remote non-cooperating, optical beam transceivers are disposed so that optical alignment between them is possible. A controller selectively causes one of the transceivers, while acquiring a communication link, to operate in a search mode, and the other to operate in a stare mode. Each transceiver has an optical axis and retro-reflects all incident beams which are not substantially aligned with the axis but does not reflect incident beams aligned with the axis. Each transceiver includes an axis-aligned beam transmitting source, a detector of incoming axis-aligned beams, a pointer for aiming the axis anywhere within a hemispherical range while searching for the other transceiver, a component which distinguishes between a retro-reflection of a transmitted beam and an incoming beam from another such transceiver, a sensor for quantitatively measuring the power of retro-reflected beam, a controller for moving the axis in an abbreviated search for a direction in which the power of a retro-reflected beam is maximum, and a beam tracker for maintaining boresight alignment once the transceivers' optical axes are aligned. Preferably, each transceiver includes a matched pair of reflecting telescopes rigidly mounted with their optical axes precisely aligned, one each for transmitting and one for receiving optical beams. Each telescope should include a primary reflector, a subreflector with a Cassegrainian focus behind the primary reflector, and a retro-reflector behind a vertex aperture in the primary reflector.

2 Claims, 2 Drawing Sheets

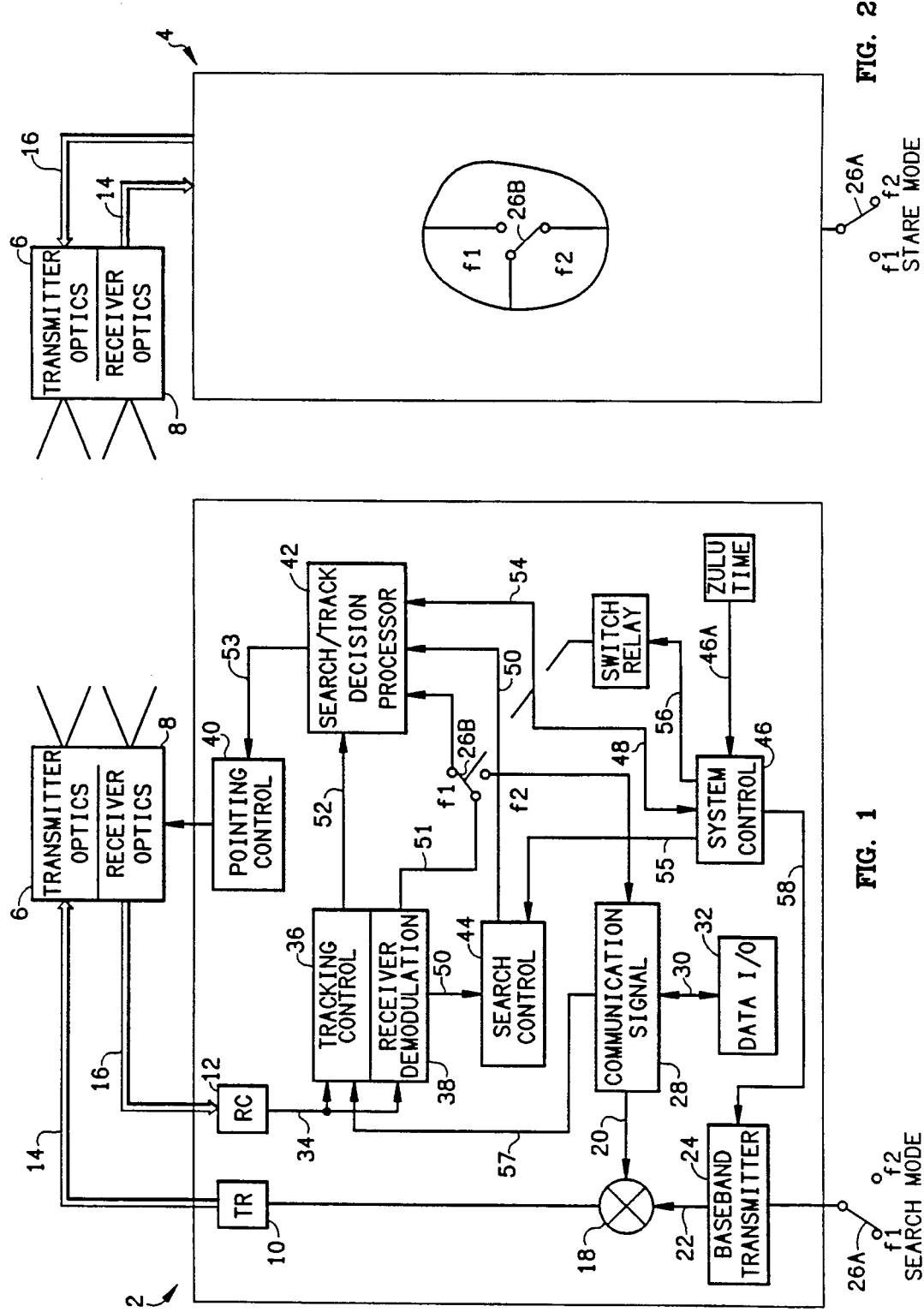

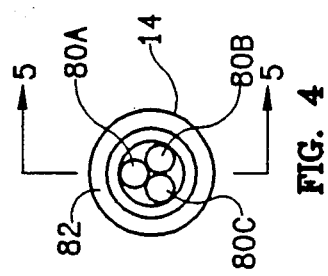
FIG. 4
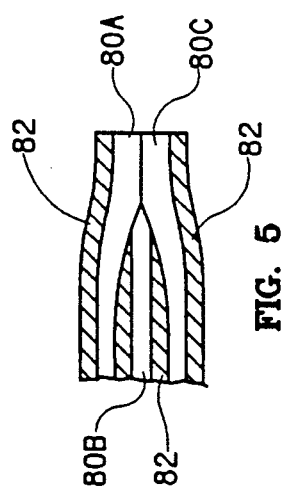
FIG. 5
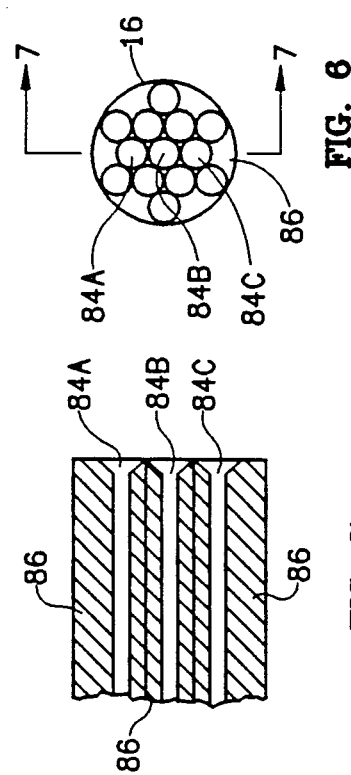
FIG. 6
FIG. 7
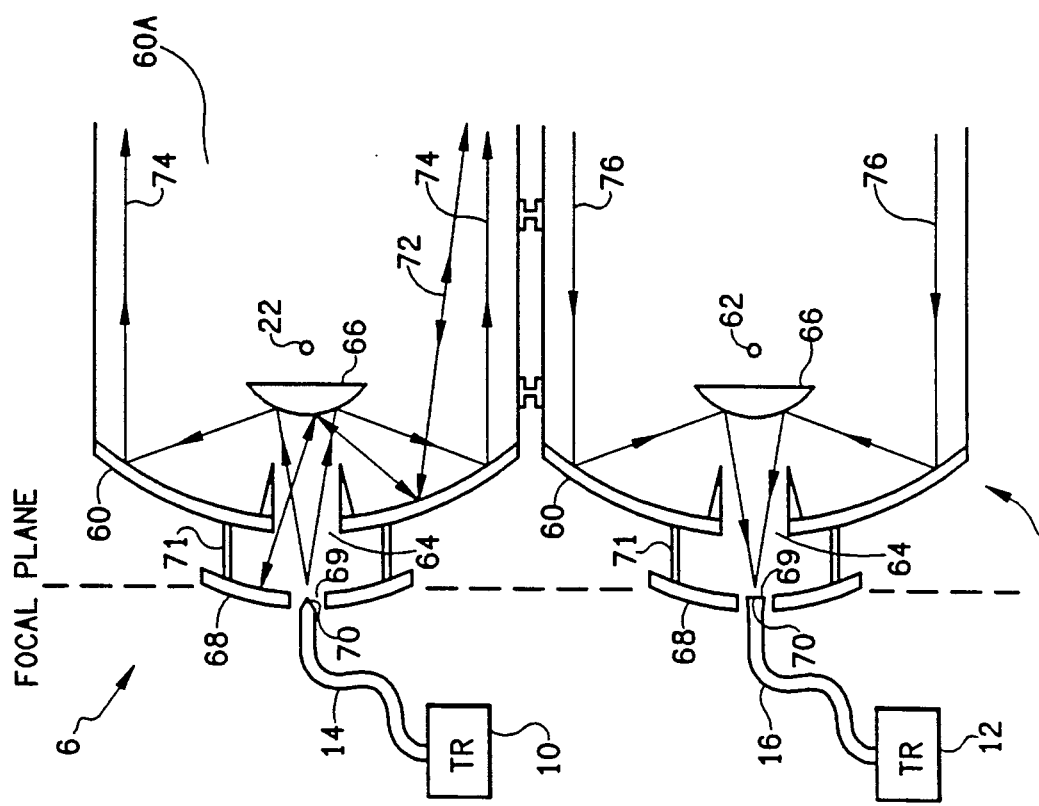
FIG. 3

ALIGNMENT ACQUIRING, OPTICAL BEAM COMMUNICATION LINK

BACKGROUND OF THE INVENTION

This invention relates in general to means for acquiring a communication link between two un-cooperating, optical transceiver systems, and in particular to such means which utilize reflecting telescopes.

While it is known that the use of a boresight mounted transmitter pair provides tight, secure communication with optical transmitter/receiver (transceiver) elements, such a configuration has problems in establishing boresight locking, tracking and search pattern techniques. U.S. Pat. Nos. 3,566,126 by Lang et al. and 3,511,998 by Smokler show the need for and problems associated with establishing two-way optical communication between remote, un-cooperating transceivers. Lang et al. presents a corner reflector at a first terminal to aid in acquisition of it by a second terminal in the absence of a transmitted signal from the first terminal. Smokler presents the use of separate frequency sets, $f_1$ and $f_2$, to distinguish between a stand-by mode (transmitting $f_1$ and receptive to $f_2$) and a call-up mode (transmitting $f_2$ and receptive to $f_1$). U.S. Pat. No. 3,504,182 by Pizzurro et al. presents optical tracking with non-coaxial optics and the use of a retro-reflector, but multiple wavelength light beams are used rather than multiple frequency communication modulation frequencies as used in this invention. U.S. Pat. No. 3,658,426 by Vyce presents the use of light pipes and retro-reflectors in measuring displacement of a remote object, with the light pipes (or fiber optic bundles) serving as a single, convenient optical pathway. Other optical communication systems either propose various tracking and communication systems, some with fiber optic omnidirectional detectors (U.S. Pat. No. 3,341,707 by Windfield), tracker schemes (U.S. Pat. Nos. 4,279,036 and 4,576,480 by Pfund and Travis, respectively), or optical pointing schemes (U.S. Pat. Nos. 4,330,204 and 4,603,975 by Dye and Cinzori, respectively). U.S. Pat. No. 3,504,979 by Stephany presents passive and active tracking using a retro-reflector or other types, such as a cat's eye, but due to optical limitations, the retro-reflector must be smaller in size than the cross-sectional area of the incident beam. U.S. Pat. No. 3,942,894 by Maier presents a pass-through optical system with a return reflection path for auto collimation with an input beam. This is just a local form of optical alignment with an incoming beam.

This invention utilizes a unique combination of multiple tapered fiber optics, dual boresighted telescopes with self-contained transmitter/receiver systems, and cat's eye reflector optics that provides a mechanically controlled boresight alignment precision that exceeds that of any previously presented systems. It also has the unique aspect that communication between transceiver sets only requires relative hemisphere location knowledge, and modest timekeeping accuracy.

Other advantages and attributes of this invention will be readily apparent upon a reading of the text hereinafter.

SUMMARY OF THE INVENTION

These objects are accomplished by an optical beam transceiver having a matched pair of reflecting telescopes, one for transmitting and one for receiving optical beams, each telescope having: (1) a primary means for parabolically reflecting an incident beam, said primary means having a focal point and defining an aperture at its vertex, (2) a secondary means optically aligned with said primary means and interposed between said primary means and the primary means focal point for hyperbolically reflecting beams incident upon it from the primary means through said aperture, said secondary means having a focal point behind the primary means, the primary means aperture being large enough to permit substantially all of the beams secondarily reflected by said secondary means to pass therethrough, and (3) a tertiary means optically aligned with the primary means for retro-reflecting any beams incident upon it passing through said primary means aperture, said tertiary means defining an aperture at its vertex. The transceiver also having: (1) a means for transmitting an optical beam through the aperture of the tertiary means of the transmitting telescope, said optical beam being optically aligned with said telescope's primary means and aimed at said telescope's secondary means, the aperture of said telescope's tertiary means being generally only large enough to permit passage therethrough of the transmitted beam, and (2) a means for detecting any optical beam passing through the aperture of the tertiary means of the receiving telescope from said telescope's secondary means, the aperture of said telescope's tertiary means being generally only large enough to permit passage therethrough of the beams converging on said telescopes' secondary means focal point.

BRIEF DESCRIPTION OF THE DRAWINGS

FIG. 1 is a block diagram of a first transceiver of this invention.

FIG. 2 is a block diagram of a second transceiver of this invention.

FIG. 3 is a schematic diagram of the transmitter and receiver optics of a transceiver of this invention.

FIG. 4 is an elevational view of the terminus of a transmitter fiber optic bundle.

FIG. 5 is a partial section of the terminus of the transmitter fiber optic bundle.

FIG. 6 is an elevational view of the terminus of a receiver fiber optic bundle.

FIG. 7 is a slightly expanded cross-section of the terminus of the receiver fiber optic bundle of FIG. 6 taken along line 7—7.

DESCRIPTION OF THE PREFERRED EMBODIMENT

Referring to FIGS. 1 and 2, two transceivers, generally designated 2 and 4, are illustrated. The optical systems 6 and 8 are physically separated, but collocated on the same platform as the rest of the system. This allows physical motion under the pointing control function 40. Most of the transceiver of FIG. 2 is not shown in detail block form because it is identical to the transceiver of FIG. 1, so a description of one will fully describe the other except where differences in switch settings are specifically noted.

Referring to FIG. 1, transmitter optics 6 and receiver optics 8 comprise a matched pair of front surface reflecting telescopes each having a Cassegrainian focus (CF), one for receiving and one for transmitting optical beams, each telescope having an internal, cat's eye type of retro-reflector. They are rigidly mounted in relation to each other with their optical axes being boresight aligned, and as such they are pointing in the same direction with their optical axes being parallel or substantially parallel. The telescope pair are gimbal/motor controlled in unison such that they have a pointing range of a full hemisphere. Said telescopes are physically separated from the main system, but collocated on the same platform and will be described in more detail hereinafter.

A transmitter (TR) 10 and a receiver (RC) 12 are in optical communication with the Cassegrainian focal points of the transmitter optics 6 and receiver optics 8, respectively, preferably via a flexible transmitter optic fiber bundle 14 (FIG. 4) and a flexible receiver optic fiber bundle 16 (FIG. 6). The transmitter 10 produces a modulated optical beam corresponding to signals it receives from a signal mixer 18. The mixer modulates communication signals 20 with baseband signals 22 from a baseband transmitter 24. The baseband transmitter generates a periodic baseband signal of frequency $f_1$, or $f_2$, depending on the setting of a selection switch 26A, $f_1$ being a search mode frequency and $f_2$ being a stare mode frequency for illustrative purposes only. A communication signal adapter 28 receives data 30 from a data input/output device 32 interfaced to a data source (not shown). Said adapter 28 produces signals 20 which correspond to the data received and which are adapted to the mixer 18. The receiver 12 produces signals 34 corresponding to and in response to a modulated optical beam received via the receiver optics 8 and fiber bundle 16, and communicates the signals 34 to a tracking controller 36 and a receiver demodulator 38.

The transmitter bundle 14 is an array of a plurality of optical beam carrying fibers for redundancy. The transmitter is preferably one or more optical lasers. The receiver bundle 16 is likewise a plurality of optical beam carrying fibers, the fibers communicating with a matrix of beam detecting elements in the receiver 12, such as photodiodes. Receiver 12 comprises cross-diode comparison for relative spatial power measurement uses for multi-quadrant tracking. Preferably the photodiodes are PIN (positive-intrinsic-negative) diodes which characteristically change electrical conductivity in synchronism with the changes in intensity of incident light.

Referring again to FIG. 1, the direction in which the transmitter and receiver optics are pointing is determined by a pointing controller 40 which includes a gimbal mechanism to give the optics at least two mutually perpendicular axes of rotation over a range of at least a hemisphere. Movement information, such as azimuth and bearing, is communicated to the pointing controller by a search/track decision processor 42 which receives information from a search controller 44 and a system controller 46. The search/track decision processor 42 also receives information 51 from the receiver demodulator 38, the information being at least an indication of whether the beam being received is modulated by a first baseband frequency, $f_1$, or is modulated by a second baseband frequency, $f_2$, said information being communicated through a switch 26B which can be a relay, solid state switch, or the like selectively energized by the system controller 46 through a pathway 56, or even a software flag.

The search/track decision processor 42 communicates commands 53 to the pointing controller 40 for directing it through two types of angular motions. These are the track and search modes of pointing. In the track mode, the processor 42 aligns the receiver optics 8 via the pointing controller 40 to maximize the received energy at the baseband intensity modulation frequency $f_1$, at the spatial centroid of the receiver fiber optic array 16. An error signal 52 is determined by the tracking controller 36 and communicated to the processor 42. This feedback tracker control system utilizes conventional algorithms in the tracking controller 36, such as Kalman or alpha-beta trackers, which account for angular motion and acceleration of the received spot across the array 16. The tracking can be modulation frequency independent, if sufficient intensity is present based on range-to-source separation and background clutter, or it could include received signal enhancement at $f_1$ by frequency signal electronic filtering.

In the search mode, the search controller 44 communicates predetermined search strategy signals 50 to the processor 42 based on information signals 55 (such as sector, rate, angular diameter) received from the system control 46. This information consists of the relative Zulu time 46A and modulation frequency choice, based on predetermined time period masking such as even periods of search at $f_1$ or odd periods of stare at $f_2$. The system controller 46 also sets the appropriate baseband frequency switch 26A via a link 58.

The search strategy utilizes relative angular velocity motion within the chosen hemisphere of operation. It is recognized that a constant angular search velocity with encoded location information can optimize the acquisition phase, whereby the particular pointing angle is encoded in the transmitted baseband. Moreover, the low probability of intercept when two transceivers are simultaneously searching is also recognized. Either strategy is contained in this design, since relative motion is contained in the search/stare state definitions. The other transceiver is also in a stare mode (or a search mode if the encoded form is used) that depends only upon relative angular velocity as determined by transceiver platform motion for search control. The search follows a spiral path with the required detection integration time for alignment detection being on the order of the ratio of the received spot angular beam width to the angular search velocity.

For searching, the receiver is demodulated by demodulator 38 at the transmitted frequency $f_1$ and communicates the potential detection of the reception of the transmitted and reflected spot through pathway 26B to the decision processor 42, simultaneously communicating the search control information 50A to the search controller 44. When the search mode establishes a track in the transmitted frequency $f_1$ due to the strength of the $f_1$ signal 51 communicated from the receiver demodulator, the system controller 46 is notified of a transmitted-reflected beam tracking via signal path 54 and reduces the angular region of the search mode spiral pattern.

The unique impact of this invention is utilized in this phase of the search mode. When the transmitted frequency $f_1$ is received in the search mode, a near-boresight alignment to the other transceiver is at hand, but alignment error is only within the optical cone allowed by the transceiver aperture and cat's eye reflector focal point, and aperture. This angular overlap of the search mode transceiver and the stare mode transceiver is sufficient to reduce the search mode to a sufficiently short time, but the alignment is not precise enough to establish two-way communication, since only locally transmitted energy is being received. However, when the reduced spiral search mode is performed with reflected spot tracking, this misalignment error is quickly reduced. At the precise moment that the transmitted frequency $f_1$ is beginning to peak in the centroid of the receiver optic array, the received modulation frequency at $f_1$ is reduced in power as measured by an adaptive threshold sensing circuit, and the system controller 46 shifts the search controller 44 frequency at switch 26B via control signal 56 to $f_2$, which is the modulation frequency of the stare mode transceiver 4, and is indicative of precision optical alignment between the two transceivers. Now, the tracking information is derived from the communication frequency $f_2$ via the communication signal strength 57 in the communication signal adapter 28. The search/track decision processor 42 shifts to tracking at the aligned frequency $f_2$ and maintains optical alignment, even with relative platform motion, since this signaling of alignment is also received by the other transceiver 4 (i.e., it transmits at $f_2$ because it is in the stare mode, but receives on $f_1$ to determine when it is optically aligned and to track on $f_1$. Initially, it tracks at $f_2$ since it will sense its own baseband frequency first due to the cat's eye reflector 68 (FIG. 3) of the search mode transceiver 2.

In this manner of Zulu time coordinated stare/search mode operations, simulations can show that within an allowable time, two transceivers can obtain precision optical boresight alignment with modest angular search velocities and modest optical light cones and intensities. An interruption of the communication signal ($f_2$) level is sensed by the tracking controller 36 via communication signal strength indication 57 from the communication adapter 28. The interruption causes the decision processor 42 to initiate a reacquire search mode in the system controller 46 via communication path 54. This reacquire mode can involve historical tracking information contained in the system controller for a reduced search mode spiral. The other transceiver 4 operates in a similar strategy utilizing lost signal strategy with local Zulu time and historic tracking information.

The tracking controller 36 is designed to lock onto signals of only $f_1$ or $f_2$ modulation by center Gaussian response pointing control. This is a process whereby the received intensity spot is assured to be Gaussian in angular shape, and hence the multiple diode received intensities can be used to interpolate the exact centroid spot position. The position rate of motion (angular velocity) and velocity rate are used as pointing control parameters in a tracking feedback mode based upon Kalman or alpha-beta state representation. Each transceiver of the pair, 2 and 4, trying to achieve boresight alignment initiates a search mode by sector stare mode positioning and sector search mode traversing. Sector stare mode requires that a fixed, absolute angular position be maintained over a short time. Sector traverse mode requires a changing angular position occurring at constant angular velocity which traverses the complete sector, such as with a spiral search with decreasing radius, at a rate to maintain constant angular velocity. Coordination of mode form and frequency of transmission can be chronologically controlled through local Zulu time. It is assumed that the dual transceivers are co-located in a common hemisphere, such that within gimbal control [range], a boresight solution is possible.

Referring to FIG. 3, the transmitter optics 6 and the receiver optics 8 of the transceivers are more fully illustrated, and comprise a matched pair of front surface reflecting telescopes. Since the optics of transceiver 4 are identical to those of transceiver 2, a description of one is sufficient to describe the other. Each telescope has a primary reflector 60, which defines the entrance aperture 60A, for parabolically reflecting an incident beam, said primary reflector having a focal point 62 and defining a second aperture 64 centered at its vertex of the optical axis of the primary reflector. A secondary reflector 66 is optically aligned with the primary reflector 60 and is interposed between the primary reflector and the primary reflector focal point 62. The reflecting surface of the secondary reflector faces the primary reflector and hyperbolically reflects beams incident upon it from the primary reflector through the aperture 64 to the vertex 70 of the combined "virtual" focal point of the real focal point 62. The secondary reflector has a focal point at this vertex, behind the primary reflector, the focal point being the Cassegrainian focal point of the telescope. The primary reflector aperture 64 is large enough to permit substantially all of the beams secondarily reflected by the secondary reflector to pass therethrough. A tertiary reflector 68 is optically aligned with the primary reflector for retro-reflecting any beams incident upon it passing through the primary reflector aperture 64, the vertex of the reflecting surface of the tertiary reflector being generally at the secondary reflector focal point, i.e., the Cassegrainian focal point. The tertiary reflector 68 defines a third aperture 69 centered at its vertex.

Referring again to FIG. 3, an optical beam being transmitted by the transmitter 10 is guided by the fiber bundle 14 to pass through the aperture 69 of the tertiary reflector 68 of the transmitting telescope 6. The terminus of the fiber bundle is aligned for each fiber such that an optical beam exiting said terminus from any single fiber is aligned with the telescope's optical axis and aimed at the telescope's secondary reflector. The aperture 69 of the transmitting telescope's tertiary reflector is generally only large enough to permit passage therethrough of the fiber bundle 14, or alternately an optical beam exiting the bundle terminus. The optical fibers are hot drawn down to a tapered point as a tri-axis bundle (FIGS. 4 and 5), which is then boresight fitted with the reflector aperture 68, which is co-aligned in both axis and focal point with the first reflector utilizing attachment points 71. The transmitter bundle is a plurality of optical beam conducting fibers, e.g. 80A, 80B and 80C, surrounded by cladding 82. The fibers are drawn down to "bare" coaxis fibers in a very small region of the entire bundle. Similarly, the receiver bundle (FIGS. 5 and 6) has fibers 84 and cladding 86. The diameters of fibers are expanded at their common terminus to accept all "bare" butting incident received light directly into the fiber optic pathways.

Referring again to FIG. 3, an optical, beam incident upon receiving telescope 8 and converging on the Cassegrainian focal point of said telescope will impinge upon the terminus of the receiving fiber bundle 16 and be guided by the fiber bundle to the receiver 12. The aperture 69 of said telescope's tertiary reflector 68 is generally only large enough to permit passage therethrough of the fiber bundle 16, or alternately the beams converging on the Cassegrainian focal point. The Gaussian spot is smaller than the full, multifibered, "butted" taper area, allowing for multiple reception points in conjunction with the quadrant, angular spot motion tracking requirements.

For example, the transceiver 4 illustrated in FIG. 2, being unaligned with transceiver 2, initiates a search mode with communication tracking initiated on $f_1$ reception. A beam having a baseband frequency of $f_2$ is transmitted by transceiver 4, but since the two transceivers are not yet boresight aligned, the beam will be reflected back to transceiver 4. This is the cat's eye retro-reflected signal designated 72 in FIG. 3. Transceiver 2 is transmitting signals 74 at a baseband frequency of $f_1$. Transceiver 4 then continues its search pattern. The transceiver 4 receives the $f_1$ signal and adjusts its stare mode to track $f_1$. It is also transmitting at frequency $f_2$ and can initiate tracking from the stare mode on $f_2$ first, if such a strategy is appropriate for relative hemisphere search/stare patterns. It can be shown that when precise boresight locking is achieved, then and only then, will both systems receive a laser modulation separate from their own transmission, i.e., transceiver 2 will receive only the $f_2$ transmissions 76 from transceiver 4, and transceiver 4 will receive only the $f_1$ transmissions 74 from transceiver 2. This is due to the precision of the cat's eye reflector/fiber optic alignment. At this point communication is established, and the tracking of the two transceivers is based upon the two-way communication spot reception (transceiver 2 tracks $f_2$, transceiver 4 tracks $f_1$) rather than the one-way search spot reception (transceiver 2 searches or tracks $f_1$, transceiver 4 stares or tracks $f_2$).

Referring to FIGS. 4 and 6, transmitter and receiver optic fiber bundles, 14 and 16 respectively, are illustrated. The transmitter bundle 14, as illustrated, has three redundant fibers, 80A, 80B and 80C, confined in sleeving or cladding means 82. The advantage of such redundancy are that multiple laser diode sources can be used to extend the system lifetime, or when used together, extend the system range. The receiver bundle 16 has many more fibers, some of which are designated 84A, 84B and 84C for illustrative purposes only. The fibers are confined in sleeving or cladding means 86. The purpose of the multiple receiver fibers is to again provide receiver angular sensitivity and increased intensity sensitivity, or a receiver diode redundancy to increase system lifetime.

A Fabry-Perot interferometer filter can be used to limit the intensity of the background, non-laser wavelength light. The PIN diode receivers are redundant, as are the lasers, and tuned only to the two modulation frequencies, as well as the filter wavelengths.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. Transmitter and receiver optics for an optical beam transceiver comprising:
    (a) a matched pair of reflecting telescopes rigidly mounted in such relation to each other that they are pointing in the same direction with their optical axes being boresight aligned, one for transmitting and one for receiving optical beams, each of said telescopes comprising:
        (1) a primary means for parabolically reflecting an incident beam, said primary means having a focal point and defining an aperture at its virtual focal point vertex,
        (2) a secondary means optically aligned with said primary means and interposed between said primary means and the primary means focal point for hyperbolically reflecting beams incident upon it from the primary means through said aperture, said secondary means having a focal point behind the primary means, the primary means aperture being large enough to permit substantially all of the beams secondarily reflected by said secondary means to pass therethrough, and
        (3) a tertiary means optically aligned with the primary means for retro-reflecting any beams incident upon it passing through said primary means aperture, the vertex of said tertiary means being generally at the secondary means focal point, said tertiary means defining an aperture at its vertex,
    (b) a means for transmitting an optical beam through the aperture of the tertiary means of one of the telescopes, said optical beam being optically aligned with said telescope's primary means and aimed at said telescope's secondary means, the aperture of said telescope's tertiary means being generally only large enough to permit passage therethrough of the transmitted beam,
    (c) means for detecting any optical beam passing through the aperture of the tertiary means of the other telescope from said other telescope's secondary means, the aperture of said other telescope's tertiary means being generally only large enough to permit passage therethrough of the beams converging on said other telescopes' secondary means focal point, and
    (d) means for selectively pointing the telescopes in unison over a suitable range.

2. Transmitter and receiver optics for an optical beam transceiver comprising:
    (a) a matched pair of front surface reflecting telescopes rigidly mounted in relation to each other such that they are pointing in the same direction with their optical axes being boresight aligned, one for transmitting and one for receiving optical beams, each having a primary reflector and a subreflector with a Cassegrainian focus behind the primary reflector, each primary reflector defining an aperture at its vertex large enough to permit substantially all subreflected beams passage therethrough,
    (b) a pair of retro-reflectors disposed one each behind the primary reflectors, aligned optically with each respective subreflector, and with their vertices generally at each respective Cassegrainian focal point, each of the retro-reflectors defining an aperture at its vertex,
    (c) a means for transmitting an optical beam through the aperture of the retro-reflector of the transmitting telescope, said optical beam being optically aligned with said telescope and aimed at said telescope's subreflector, the aperture of said telescope's retro-reflector being generally only large enough to permit passage therethrough of the transmitted beam,
    (d) a means for detecting any subreflected optical beam passing through the aperture of the retro-reflector of the receiving telescope, the aperture of said telescope's retro-reflector being generally only large enough to permit passage therethrough of the beams converging on said telescopes' Cassegrainian focal point, and
    (e) means for selectively pointing the telescopes in unison over a suitable range.

* * * * *